Figure 1:
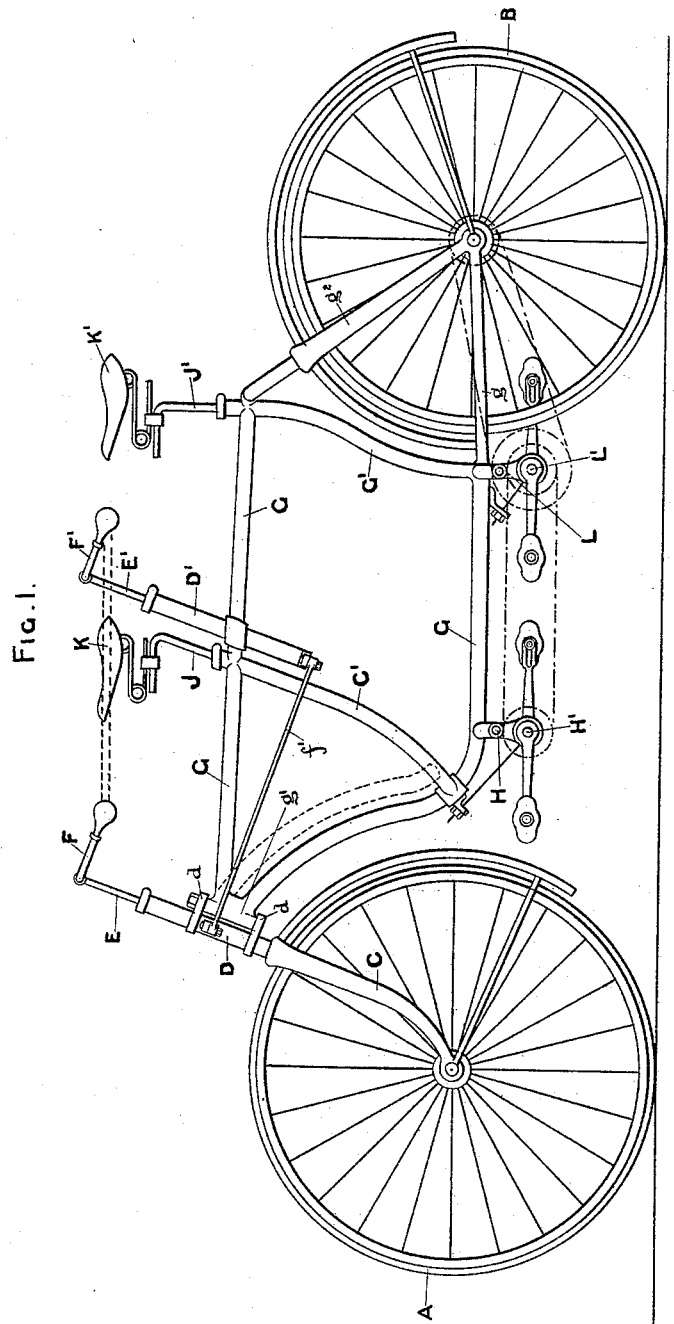

(No Model.)
2 Sheets—Sheet 1.

J. W. HALL.
VELOCIPEDE.

No. 391,895.    Patented Oct. 30, 1888.

WITNESSES:
Edward C. Hammond.
Arthur M. Flack.

INVENTOR:
John William Hall.
By his Attorney
Robt. S. d. Phillips.

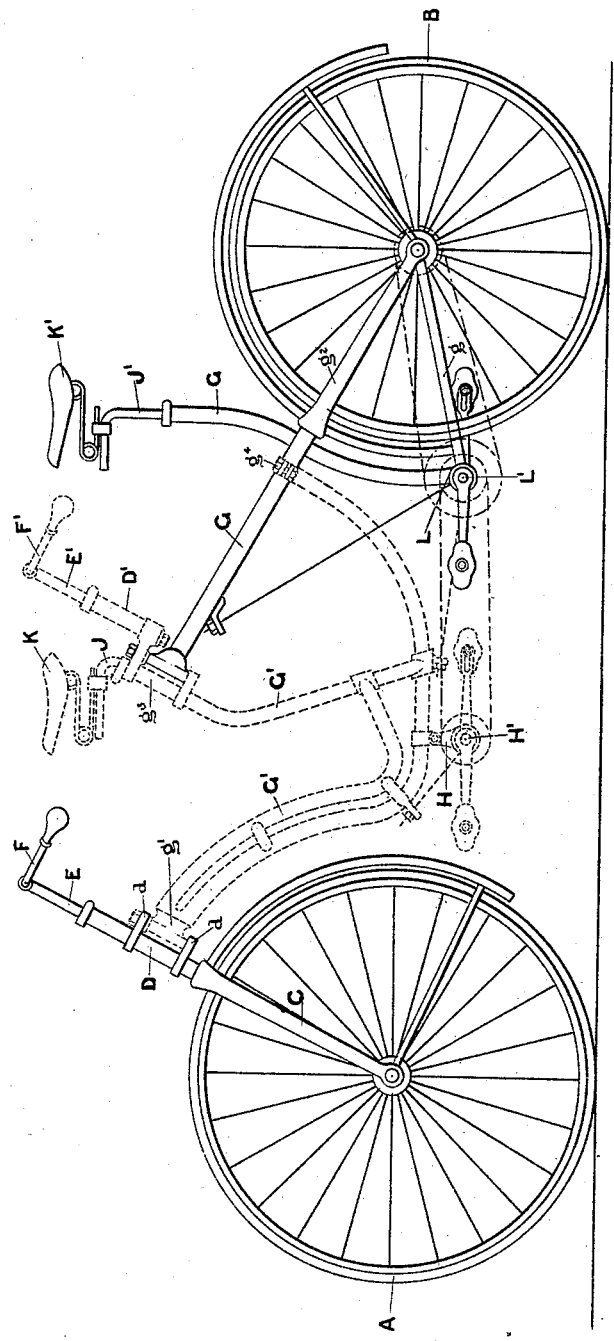

UNITED STATES PATENT OFFICE.

JOHN WILLIAM HALL, OF LONDON, COUNTY OF MIDDLESEX, ENGLAND.

VELOCIPEDE.

SPECIFICATION forming part of Letters Patent No. 391,895, dated October 30, 1888.

Application filed April 23, 1888. Serial No. 271,581. (No model.) Patented in England September 29, 1887, No. 13,191.

*To all whom it may concern:*

Be it known that I, JOHN WILLIAM HALL, a subject of the Queen of Great Britain, residing in the city of London, in the county of Middlesex, England, have invented new and useful Improvements in Velocipedes, (for which I have obtained an English Patent, dated September 29, 1887, No. 13,191,) of which the following is a specification.

My invention relates to, first, a bicycle for carrying two riders tandem-fashion, and, secondly, to a modification thereof, whereby the said tandem bicycle may be converted into an ordinary rear driving front-steering bicycle.

The objects of my invention are, first, to enable the machine to be ridden by a single rider from either seat; secondly, to provide a ready means of converting the machine into an ordinary rear-driving bicycle for one rider, and, thirdly, to increase the stability of the machine and render it more easy to ride and steer. I attain these objects by the bicycle illustrated in the accompanying drawings, in which—

Figure 1, Sheet No. 1, is a view showing my improved tandem bicycle, and Fig. 2, Sheet No. 2, is a view showing a convertible tandem bicycle embodying my invention.

Throughout both views similar parts are marked with like letters of reference.

Referring to Fig. 1, Sheet No. 1, of the accompanying drawings, it will be seen that my improved tandem safety-bicycle has two equal or approximately equal sized wheels, A and B, the rear one of which, B, is the driver, and the front one, A, the steering-wheel. The wheel A is mounted in a fork, C, of the usual type, terminating in a steering-post, D, in which fits adjustably a steering-spindle, E, carrying a transverse handle-bar, F. On the steering-post D are formed lugs $d\ d$, carrying centers forming part of a head, by which the main frame G, carrying the driving-wheel B and other parts, is pivotally connected thereto. The driving-wheel B is mounted in a double-forked frame, the lower part of which, $g$, runs horizontally or approximately horizontally forward to the periphery of the wheel, where it is connected to a backbone, forming part of the main frame G, which extends forward in the same horizontal plane for a convenient distance to carry the bearing-bracket H of the front pedal-axle, H', after which it curves upward and follows the outline of the steering-wheel and terminates in a neck, $g'$, to engage with centers formed by or in the lugs $d\ d$, thus completing the hinge or joint by which the frame carrying the steering-wheel is turned for the purpose of steering the machine. The top part, $g^2$, of the double-forked frame carrying the driving-wheel extends upward and then runs forward as a backbone, terminating at the neck $g'$. This backbone carries the pillar J' for the rear saddle, K', the pillar J for the front saddle, K, and the tube or socket D' for the steering-post E', carrying the transverse handle-bar F'. The top backbone of the frame G is stayed or trussed to the lower backbone by the tubes C' C', as shown. The rear pedal-crank axle, L', is mounted in a bracket, L, carried by the lower backbone, in close proximity to the driving-wheel B, with which it is connected by chain-gearing in the usual manner. The front pedal-crank axle, H', is connected by a chain either directly with the driving-wheel B or with the rear pedal-crank axle, L'. In the latter case I prefer to mount the driving-chain central with the machine, and use two chains for communicating the motion from the rear pedal-crank axle to the driving-wheel, one on either side thereof. The machine may be steered by the front rider alone by means of the handle-bar F, or by both in combination, in which case the rear steering-post, E', is mounted loosely in the post or socket D', and is connected with the steering-post D', and is connected with the steering-post D by one or two coupling-links, $f$, or the handle-bars F and F' may be connected together directly by a coupling rod or link, as shown in dotted lines.

In this machine it will be seen that both riders are mounted between the wheels, so that the weight is equally distributed between them, and all tendency for the machine to tip up when ridden by a single rider is overcome.

When the machine is required to carry a lady on the front seat, the main frame G is modified, as shown in dotted lines, the top backbone terminating at the front-seat pillar and the lower backbone, where it curves up to the neck, being stiffened by a second tube, as shown in dotted lines.

The modification necessary to make the machine convertible into an ordinary rear-driving safety-bicycle is illustrated by Fig. 2, Sheet No. 2, of the accompanying drawings; and it consists in making the main frame of the machine in two parts, one of which, G, (which carries the driving-wheel B, pedal-crank axle L, and saddle K' for the rear rider,) being made similar to that used for an ordinary rear-driving bicycle, so that when it is detached from the other part of the main frame G' (shown in dotted lines) which carries the pedal-crank axle H' and saddle K for the front rider and the handle-bar F' for the rear rider, and is connected to the fork C, carrying the steering-wheel A, the other part, G', of the main frame being removed, it forms an ordinary rear-driving safety-bicycle. The construction of the auxiliary detachable part G' of the frame will depend upon the type of safety-bicycle to which it is intended to be fitted, as various patterns of frames are now in use; but it is essential that it be fitted with a socket or neck, $g'$, at its forward extremity, to connect it to the steering post or head of the fork carrying the steering-wheel, with a post or head, $g^3$, to receive the socket or neck of the backbone G of the safety-bicycle, and also with a suitable extension provided with a coupling, $g^4$, or other suitable clamping device, to embrace the main frame G of the safety-bicycle to brace and couple up the two frames G and G' to make it one rigid frame. If desired, the several parts of the two frames may be further braced together by suitable tie-rods. All the parts of the machine to which no reference has been made present no novel features, and may therefore be of the usual type and construction.

Although my improved tandem bicycle is hereinbefore described and shown in the accompanying drawings as driven by rotary chain-gearing, I do not limit myself to this particular method of imparting motion to the rear driving-wheel, as lever and crank or clutch-gear may be used with equal effect, or a combination of both lever and rotary action may be used.

I do not limit myself to the exact construction and arrangement of parts hereinbefore shown and described, but hold myself at liberty to make such changes and alterations as fairly fall within the spirit and scope of my invention.

I am aware that tandem bicycles, both convertible and non-convertible, have already been made, and I therefore do not claim such machines, broadly; but, Having now particularly described and ascertained the nature of my said invention and in what manner the same is to be performed, I declare that what I claim is—

1. In a tandem bicycle having a rear driving-wheel and a non driven front steering-wheel, the combination, with the two seats for the riders mounted within the wheel-base, of the two pedal-driving gears arranged between the driving-wheel and the steering-wheel and adapted to be operated by the riders and communicate motion to the driving-wheel, as set forth.

2. In a tandem bicycle adapted to be converted into an ordinary rear-driving safety-bicycle, the particular construction of the auxiliary detachable frame arranged to carry the seat and pedal-driving gear for the front rider and the handle-bar for the rear rider, as set forth.

3. In a tandem bicycle, constructing the frame so that that part carrying the steering-wheel and that part carrying the driving-wheel, the rear seat, and the rear pedal-crank axle are adapted to detach from the other part of the frame carrying the front seat, front pedal-crank axle and the rear handle-bar, and to be connected together by the usual head or joint to form a rear driving safety-bicycle, as set forth.

In witness whereof I have hereunto signed my name in the presence of two subscribing witnesses.

JOHN WILLIAM HALL.

Witnesses:
ROBT. ED. PHILLIPS,
EDWARD J. HAMMOND.